No. 738,753. PATENTED SEPT. 15, 1903.
R. A. BAGGETT.
COMBINATION TOOL.
APPLICATION FILED MAR. 20, 1903.
NO MODEL.
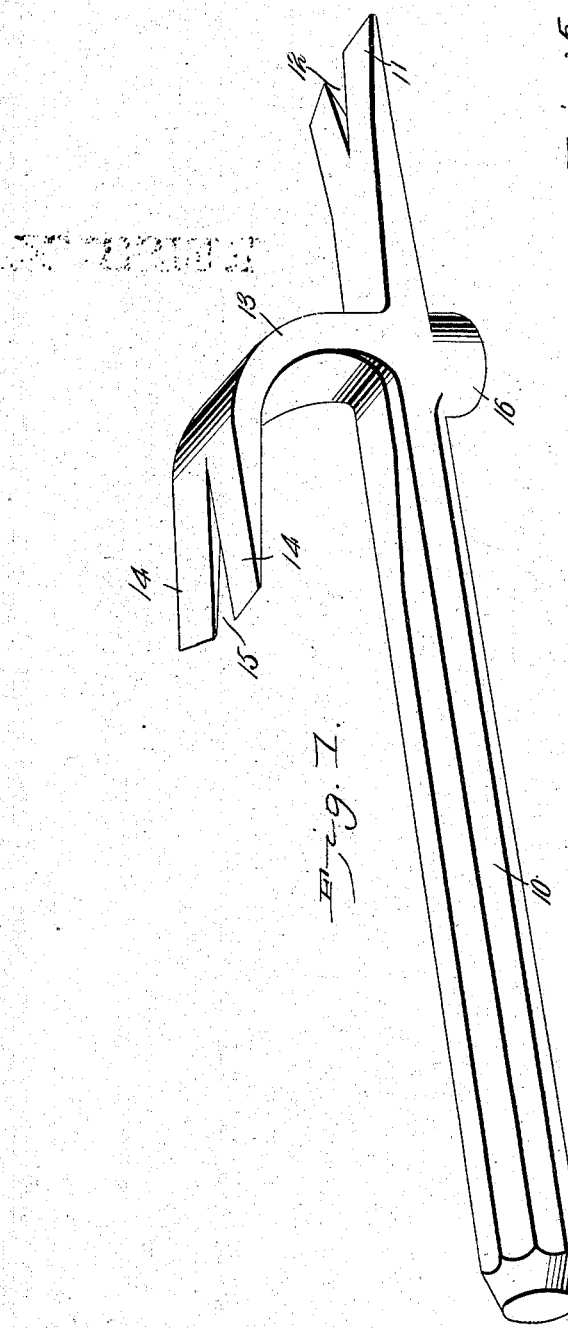
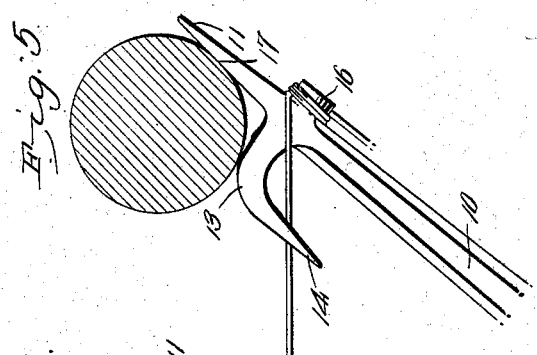
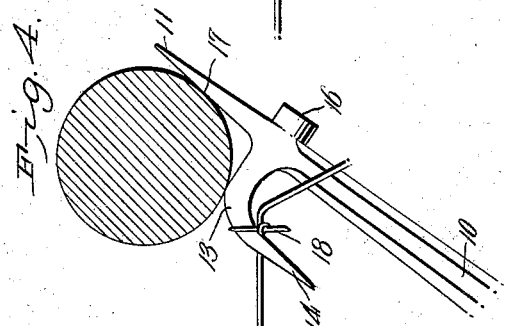
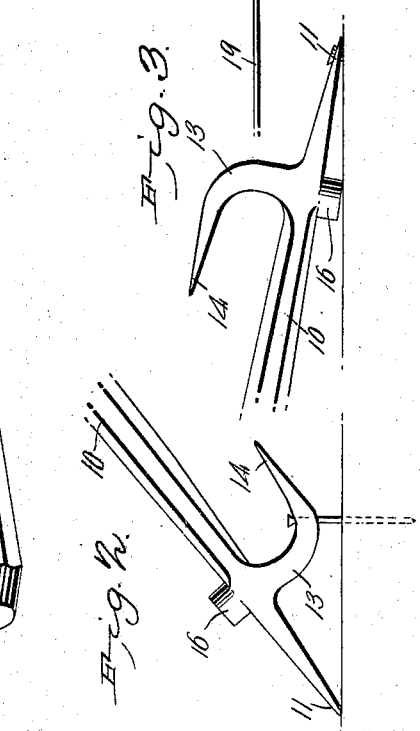

No. 738,753.                                                    Patented September 15, 1903.

UNITED STATES PATENT OFFICE.

ROBERT AMOS BAGGETT, OF BELTON, TEXAS.

COMBINATION-TOOL.

SPECIFICATION forming part of Letters Patent No. 738,753, dated September 15, 1903.

Application filed March 20, 1903. Serial No. 148,771. (No model.)

*To all whom it may concern:*

Be it known that I, ROBERT AMOS BAGGETT, a citizen of the United States, residing at Belton, in the county of Bell and State of Texas, have invented a new and useful Combination-Tool, of which the following is a specification.

This invention relates to implements adapted for opening barrels, boxes, and similar closures, and which may also be employed for stretching wires and driving or removing staples in constructing or repairing wire fences and for other purposes, and has for its object to simplify and improve devices of this character and increase the efficiency and usefulness without increasing the weight or expense.

The invention consists in certain novel features of construction, as hereinafter shown and described, and specified in the claim.

In the drawings illustrative of the invention, in which corresponding parts are denoted by like designating characters, Figure 1 is a perspective view of the improved implement. Fig. 2 is a view illustrating the manner of using the implement in drawing large nails. Fig. 3 represents the manner of employing the implement in drawing small nails or tacks. Figs. 4 and 5 illustrate the manner of employing the implement as a wire-stretcher.

The improved implement consists of a stock or handle 10 of any approved length or size, terminating in a chisel-point 11, in longitudinal alinement with the handle and preferably formed with a V-shaped cleft 12 to enable this portion of the implement to be employed for pulling tacks and small nails and also to "start" the staples securing the wires of fences and for other similar purposes.

Extending from one side of the handle 10 and spaced from the chisel end 11 is a backwardly-curved combined nail-pulling claw and wedge 13, the claw portion indicated at 14 and with spaced wedge-chisel-formed portions 15 upon each side, as shown, said divided chisel end being turned backwardly and lying in a plane parallel with the plane occupied by the stock or handle member 10 to adapt the tool to be used as a wire-stretcher.

Extending from the handle 10 on the opposite side from the nail-claw member 13 is a hammer face or lug 16 of any approved size.

With this implement many different kinds of work may be performed. For instance, the chisel end 11 may be driven between a box-cover and the body of the box and the back side of the claw 13 utilized as a fulcrum to assist the operator in prying off the cover.

The chisel-point, with its cleft 12, will be found very convenient in removing the "barrel-linings" or "clime-hoops" in opening barrels and removing the nails therefrom. The chisel-point 11, with its cleft 12, will also be found very convenient in drawing small nails or tacks, the hammer-face serving as a fulcrum when the implement is thus employed, as shown in Fig. 3.

The claw member 13 will be found very efficient in drawing larger nails, and when thus employed the chisel-point 11 serves as a fulcrum to greatly increase the "draft" and prevent the bending of the nails, as illustrated in Fig. 2.

When employed as a barbed-wire stretcher, the chisel-point will be placed against the side of the post (indicated at 17 in Fig. 4) and with the cleft 14 in the rear of the nearest barb 18 on the wire 19. Then using the implement as a lever, the wire may be stretched to any desired degree and secured by staples in the usual manner, the peculiar shape of the claw member 13 affording a better grip for the nail or wire than the ordinary claw.

When employed to stretch wire not having barbs, the wire can be wound around the hammer-face one or more turns after passing through the cleft 14, as shown in Fig. 5, to prevent slipping. Thus the implement can be employed for a variety of purposes, and all the parts coact to produce the desired results.

The implement will preferably be constructed in one single piece of steel properly tempered and may be of any desired size.

It will be found very convenient and efficient for the purposes denoted and can be manufactured very cheaply and of ample strength to resist all strains to which it will be subjected.

The implement will be found very convenient for grocers and similar merchants and also for farmers, fence-builders, and all mechanics who are called upon to perform rough repair-work.

Having thus described my invention, what I claim is—

A tool comprising a stock having a wedge-shaped end extending in longitudinal alinement therewith, a claw member composed of a flattened arm extending laterally from one of the flattened faces of said wedge-shaped stock-terminal and spaced from the end thereof, said arm being curved rearwardly at a point intermediate of its ends with the free end thereof extended in a plane parallel with the plane occupied by the stock, said claw member and wedge-shaped stock-terminal having V-shaped clefts therein opening in the same direction.

In testimony that I claim the foregoing as my own I have hereto affixed my signature in the presence of two witnesses.

ROBERT AMOS BAGGETT.

Witnesses:
  BISMARK HIATT,
  C. C. RATHER.